United States Patent [19]

Shafer

[11] 4,078,535
[45] Mar. 14, 1978

[54] MODIFICATION TO AN INTERNAL COMBUSTION ENGINE TO REDUCE BOTH FUEL CONSUMPTION AND AIR POLLUTANTS

[76] Inventor: Warner W. Shafer, 71677 Highway III, Rancho Mirage, Calif. 92270

[21] Appl. No.: 641,600

[22] Filed: Dec. 16, 1975

[51] Int. Cl.² .................. F02B 77/08; F02D 21/02
[52] U.S. Cl. .................. 123/198 D; 123/DIG. 12; 123/3; 123/119 E
[58] Field of Search ....... 123/1 A, 3, 198 D, 198 DB, 123/DIG. 12, 119 E

[56] References Cited

U.S. PATENT DOCUMENTS

| 1,496,951 | 6/1924 | Shinkle | 123/119 E |
|---|---|---|---|
| 3,602,207 | 8/1971 | Kilmer | 123/198 D X |
| 3,608,529 | 9/1971 | Smith et al. | 123/1 A X |
| 3,696,795 | 10/1972 | Smith et al. | 123/1 A |
| 3,712,281 | 1/1973 | Ruth | 123/119 E X |
| 3,844,262 | 10/1974 | Dieges | 123/1 A X |
| 3,877,450 | 4/1975 | Meeks | 123/1 A X |

Primary Examiner—Charles J. Myhre
Assistant Examiner—Ira S. Lazarus
Attorney, Agent, or Firm—K. H. Boswell

[57] ABSTRACT

A system for reducing air pollutants expelled from a standard internal combustion engine coupled with an increase in fuel economy wherein a supplemental oxygen supply is introduced into the carburetor of an internal combustion engine while the fuel supply is reduced. The supplemental oxygen supply is regulated via a variable control valve and a safety shut off valve. The safety shut off valve is activated independently by both the engine ignition switch and one or more engine parameters which are only activated when the engine is in actual operation. This only allows oxygen to pass through the safety shut off valve when the engine is running and automatically stops the oxygen flow when the ignition switch is turned off or in case of inadvertent or accidental engine shut down.

11 Claims, 6 Drawing Figures

MODIFICATION TO AN INTERNAL COMBUSTION ENGINE TO REDUCE BOTH FUEL CONSUMPTION AND AIR POLLUTANTS

BACKGROUND OF INVENTION

1. Field of Invention

This invention relates to the utilization of oxygen in an internal combustion engine.

2. Description of Prior Art

The majority of internal combustion engines are used to power the automobile. A review of previous uses of oxygen in conjunction with engines shows supplemental oxygen has been utilized to try to effect either an increase in power or to reduce air pollutants in the automobile, e.g., U.S. Pat. Nos. 1,496,951; 3,712,281; and 3,877,450.

The earliest uses of supplemental oxygen in the automobile internal combustion engine were attempts to gain added power. Improved fuels and engineering refinement and engine improvements have resulted in the modern internal combustion engine's power output being such that it is sufficient to propel the average automobile much faster than the race cars of yesterday.

The second use of oxygen in conjunction with the automobile internal combustion engine has been directed to the reduction of air pollutants. During the last decade many devices have been "tacked on" to the internal combusion engine in order to reduce the emmissions of air pollutants. Previous oxygen systems which add extra fuel to compensate for the added oxygen, and most of the "tacked on" pollutant control devices result in a loss of fuel economy; however, recent attention has been focused on the need to conserve our limited fuel resources.

Missing from the previous supplemental oxygen systems are adequate safety devices. Accidents involving automobiles happen at an alarming rate. At the time of these accidents these vehicles can carry upwards of 25 gallons of explosive fuel. The addition of an uncontrolled release of oxygen near such a source of fuel, i.e., the carburetor, presents a fire safety hazzard in case of accident.

BRIEF SUMMARY OF INVENTION

The primary object of this invention is a utilization of supplemental oxygen in an internal combustion engine such that both economy of fuel and reduction of the expulsion of air pollutants is achieved while maintaining safe control of the oxygen system by concurrently shutting off the oxygen system with either intentional, inadvertent or accidental engine stoppage.

One object of the invention is utilization of the more than adequate power efficiency of the modern internal combustion engine coupled with a reduction in both fuel supply and atmospheric gases and the addition of supplemental oxygen. This results in maintainence of the power status quo with a reduction in fuel used.

A second object of the invention is safe control of the supplemental oxygen system.

A third object of the invention is the reduction of air pollutants achieved by burning the normal hydrocarbon fuel in an oxygen enriched atmosphere, thereby reducing the expulsion of unburned hydrocarbons and lessening the release of nitrogen oxides derived from the approximately eighty percent nitrogen content of atmospheric gas.

A fourth object of the invention is easy application of the invention to the existing automobiles now in use. The average life of the modern automobile is such that to be practical, any improvement in air pollution control must be economically applicable to the already millions of existing automobiles now in use, that is it must not require extensive modification of any of the major engine components.

DETAILED DESCRIPTION OF INVENTION

Figure 1:
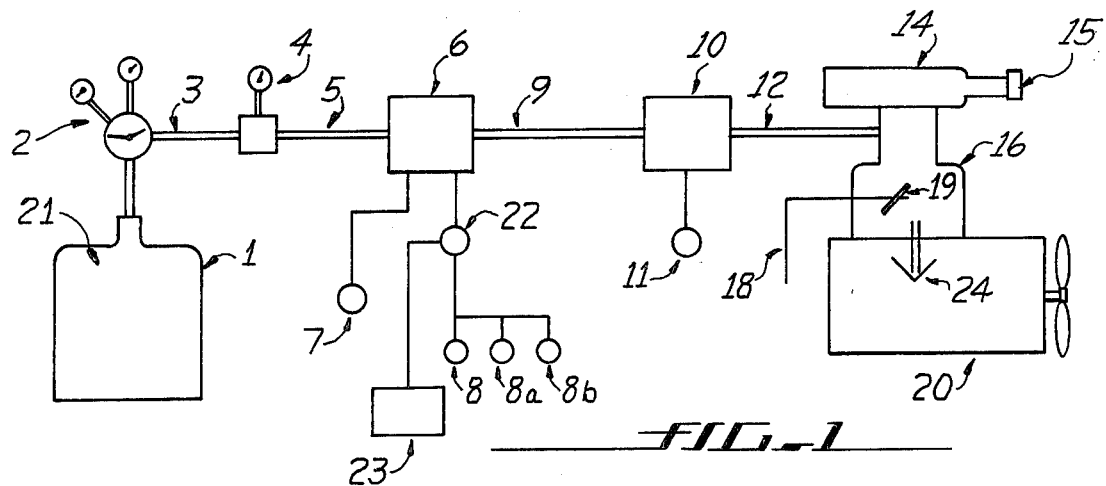
FIG. 1 is a diagrammatic presentation of the invention as applied to a standard internal combustion engine found on a standard automobile.

In FIG. 1 a standard oxygen container 1, charged with oxygen 21, is fitted with a standard pressure regulator 2. Such standard systems can utilize either liquid or gaseous oxygen, both being well known and widely used. Oxygen 21, is fed via line 3 to a low pressure regulator 4 which maintains a constant supply of low pressure oxygen in connecting line 5. Line 5 feeds oxygen 21 into shut off valve 6. Shut off valve 6 is, controlled by two or more control switches 7, 8, 8a, 8b etc. The main ignition switch 7 is utilized as one control. A second switch or optionally additional switches 8a, 8b etc are activated by physical movement, fluid pressure or electrical impulse, all variable perameters subject to engine operation. These variable perameters are chosen from but not necessarily limited to, oil pressure, manifold vacuum, cam shaft and crankshaft rotation, pulleys, belts or gears associated with either the cam shaft or crank shaft rotation, distributor rotation or electrical output. Safety valve 6 is only open allowing oxygen to flow through it, when both the ignition switch 7 is turned on and engine operation switch 8 (or optionally more than one engine operation switches 8a, 8b etc. ) is activated. To aid in starting, a starter override switch 22 can optionally be inserted between switch 8 (optionally switches, 8a, 8b etc.) and safety valve 6. When starter motor 23 is activated, both starter override switch 22 and ignition switch 7 are activated, allowing oxygen 21 to flow through safety shut off valve 6. Oxygen 21 then flows via line 9 from safety valve 6 to flow control valve 10. Flow control valve 10 varies the amount of oxygen per unit time passing through it into line 12. Control valve 10 is opened or closed via control means 11. Control means 11 is an extension of one or more of the standard components of the engine speed regulating system. Such components are chosen from but not necessarily limited to, the accelerator pedal linkage, the carburetor butterfly valve, manifold vacuum and distributor advance mechanism. Oxygen flow is increased or decreased in direct relation to the engine speed by opening or closing control valve 10 by control means 11. Oxygen 21 then flows via line 12 to a point near the throat of modified carburetor 16. Modified carburetor 16 is fitted with either a standard air cleaner housing 14 fitted with a plug 15 or with a modified air cleaner housing in which plug 15 is an integral part of air cleaner housing 14. Plug 15 restricts the flow of atmospheric gases into air cleaner housing 14. Modified carburetor 16 is a standard carburetor which has been modified by restrictions means 19. Restrictions means 19 consists of a multiplicity of components, depending on the particular carburetor involved, wherein fuel fed via fuel line 18 is restricted in the carburetor via reduction in fuel jet size, physical restrictions placed in the fuel ports to reduce their size and shortening the fuel accelerator pump stroke. Modified carburetor 16 is placed in standard relationship with engine 20. The fuel gas mixture 24 which is fed into engine 20 by carburetor 16 differs from the standard fuel gas mixture in that it has both a smaller fuel to gas ratio and a greater oxygen to nitrogen ratio.

Figure 2:
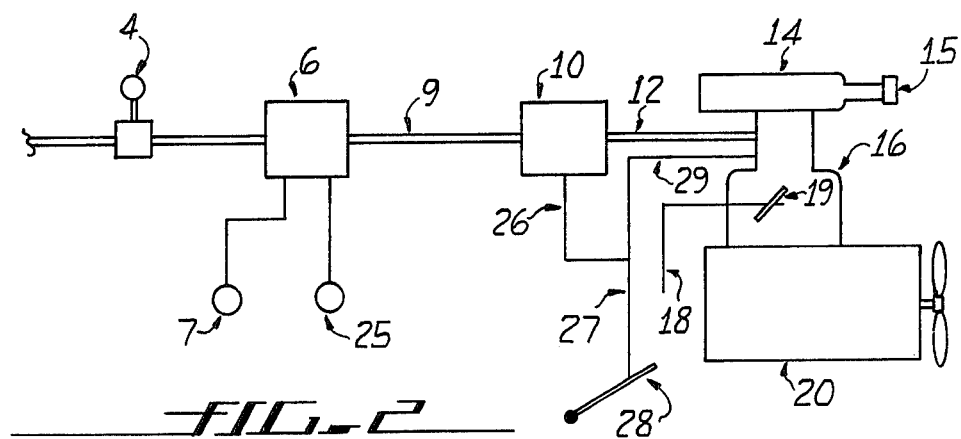
FIG. 2 is a diagrammatic presentation of a preferred embodiment of the invention as used on a standard internal combusion engine used on a standard automobile.

A preferred embodiment of the invention is shown in FIG. 2. Oxygen 21 passes from oxygen source 1 via regulator 2, oxygen line 3, low pressure regulator 4 and oxygen line 5 to safety valve 6 as described for FIG. 1. Safety valve 6 is controlled independently by both ignition switch 7 and oil pressure sensing switch 25. Only when the engine oil pressure reaches a pre-set pressure will sensing switch 25 activate safety valve 6 allowing oxygen to flow through it. When ignition switch 7 is shut off safety valve 6 shuts off oxygen supply 21 even though oil sensing switch 25 is activated. If oil pressure switch 25 is deactivated because of inadvertent or accidental engine shut down and its accompanying oil pressure drop, safety valve 6 shuts off oxygen supply 21 even though ignition switch 7 is still activated. Oxygen 21 then flows via line 9 to control valve 10. Control valve 10 is open or closed or set at any incremental position in between by control means 26. Control valve 10 provides a continuously variable flow of oxygen from 0 to maximum flow. Control means 26 is a mechanical linkage connected to the linkage 27 interposed between the accelerator pedal 28 and the carburetor 16. When accelerator pedal 28 is depressed, control means 26 causes control valve 10 to open allowing oxygen 21 to pass through control valve 10 at a rate per unit time depending on the degree of depression of accelerator pedal 28. Oxygen 21 then flows via line 12 to modified carburetor 16 equipped with air cleaner 14 filled with plug 15 and then down into engine 20 as described for FIG. 1. In normal usage control means 26 is adjusted on linkage 27 so that at idle speed a small flow of oxygen is allowed to pass through control valve 10 to sustain the requirements of engine 20 at idle and as accelerator pedal 28 is depressed, movement is transferred via linkage 27 to control means 26 until when accelerator pedal is depressed to its fullest extent, control valve 10 is open to allow optional flow of oxygen 21 to engine. Of course different settings of both minimum and maximum oxygen flow must be set for different engines depending on engine displacement and power requirements at the engine.

In yet another embodiment of the invention, wherein additional power is required and/or it is considered advantageous not to restrict the volume of fuel delivered via the accelerator pump when the accelerator pedal is depressed, an additional supply of oxygen is provided to compensate for the additional fuel injected into the carburetor by the accelerator pump. This additional supply of oxygen is provided via either a second oxygen supply line connected to the throat of the carburetor or via a reserve oxygen reservoir which is connected to the throat of the carburetor. Either system utilizes parameters associated with engine acceleration to activate the delivery of the additional oxygen. Such parameters are chosen from but are not necessarily limited to accelerator pedal depression, carburetor accelerator pump activation or a decrease in manifold vacuum.

Figure 3:
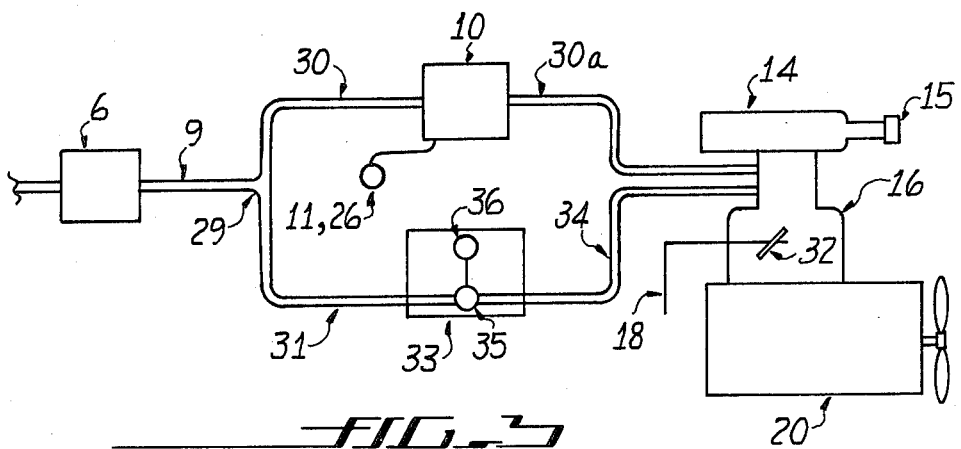
FIG. 3 is a diagrammatic presentation of the invention as applied to a standard internal combustion engine found on a standard automobile which utilizes a reserve oxygen supply system which utilizes a split oxygen stream.

In FIG. 3 oxygen is supplied via the general scheme as depicted in FIG. 1 or via the more preferred scheme as depicted in FIG. 2 up to and including safety valve 6. Oxygen 21 flows through safety valve 6 into line 9. Line 9 branches at tee 29 into lines 30 and 31. Line 30 feeds standard flow control valve 10. Flow control valve 10 is controlled via control means 11 or 26 as per FIG. 1 or FIG. 2. From control valve 10 oxgyen 21 feeds into line 30-a and then into modified carburetor 16 equipped with air cleaner 14 and plug 15. Fuel restrictions means 32 wherein fuel fed via fuel line 18 to modified carburetor 16 optionally can or cannot include a restriction of the fuel supplied from the standard carburetor accelerator pump. The second branch of oxygen supply line 31 from tee 29 feeds into supplemental control means 33. From supplemental control means 33 oxygen 21 passes via line 34 into the throat of modified carburetor 16. Supplemental control means 33 consists of a standard regulator valve 35 and an activating means 36. Activating means 36 is coupled to an engine parameter responsive to engine acceleration. Such parameters include but are not necessarily limited to engine manifold vacuum. When the engine manifold vacuum drops in response to acceleration, activating means 36 which is responsive to said drop in manifold vacuum causes regulator valve 35 to open and allows supplemental oxygen 21 to enter carburetor 16 via line 34. As engine manifold vacuum returns to normal, activating means 36 is deactivated and causes regulator valve 35 to close, stopping the flow of supplemental oxygen 21 to carburetor 16 via line 34.

Figure 4:
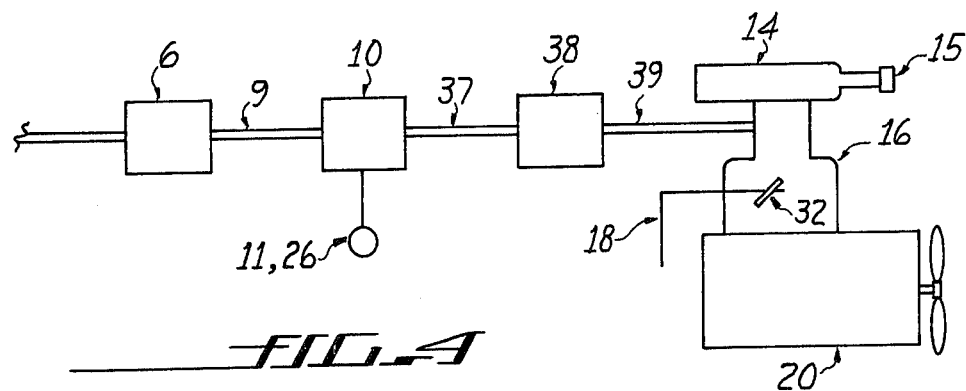
FIG. 4 is a diagrammatic presenation of the invention as applied to a standard internal combustion engine found on a standard automobile which utilizes a generalized reserve oxygen supply system which utilizes an oxygen reservoir system.

In FIG. 4 oxygen 21 is supplied via the general scheme as depicted in FIG. 1 or via the more preferred scheme as depicted in FIG. 2 up to and including flow control valve 10 and its associated control means 11 or 26. Oxygen 21 then flows via line 37 into reserve oxygen reservoir means 38 and is discharged from same via line 39 into modified carburetor 16 equipped with air cleaner 14, air plug 15 and fuel restriction means 32 wherein fuel fed via fuel line 18 to modified carburetor 16 optionally can or cannot include a restriction of the fuel supplied from the standard carburetor accelerator pump.

Figure 5:
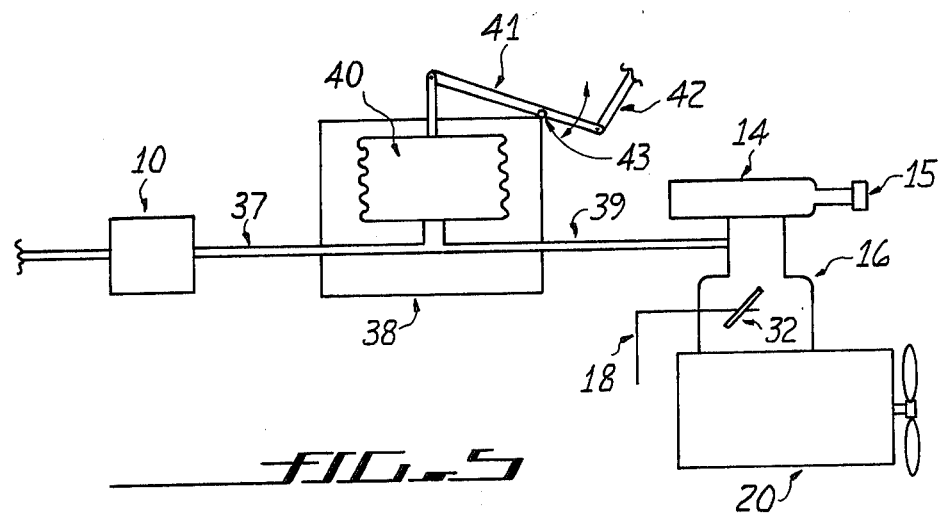
FIG. 5 is a diagrammatic presentation of the invention as applied to a standard internal combustion engine found on a standard automobile which utilizes a generalized reserve oxygen supply system which utilizes a bellows type reservoir.

In FIG. 5 an embodiment of reserve oxygen reservoir means 38 is illustrated wherein line 37 is connected to a bellows 40. Also connected to bellows 40 is discharge line 39. As such oxygen 21 is free to flow through bellows 40 from control valve 10 to carburetor 16.

Connected to bellows 40 is depression arm 41 which is attached at pivot point 43. Bellows 40 is compressed or expanded in response to depression arm 41 which is connected to linkage 42. Linkage 42 is connected to either the accelerator pedal or to the carburetor accelerator pump and is activated by movement of either of the same. When at rest bellows 40 is expanded and contains a volume of oxygen. When linkage 42 moves in response to either the accelerator pedal or the carburetor accelerator pump, depending on which it is connected to, bellows 40 is compressed forcing additional oxygen out via line 39 into carburetor 16. It is noted that in line 37 oxygen 21 is flowing at a predetermined pressure greater than atmospheric pressure and that line 39 discharges into carburetor 16 which when the engine is running is sucking gases from line 39. As such a pressure gradient is created such that the addition volume of oxygen in bellows 40 is discharged via line 39 and when after being compressed, upon decompression bellows 40 is charged with oxygen via line 37.

Figure 6:
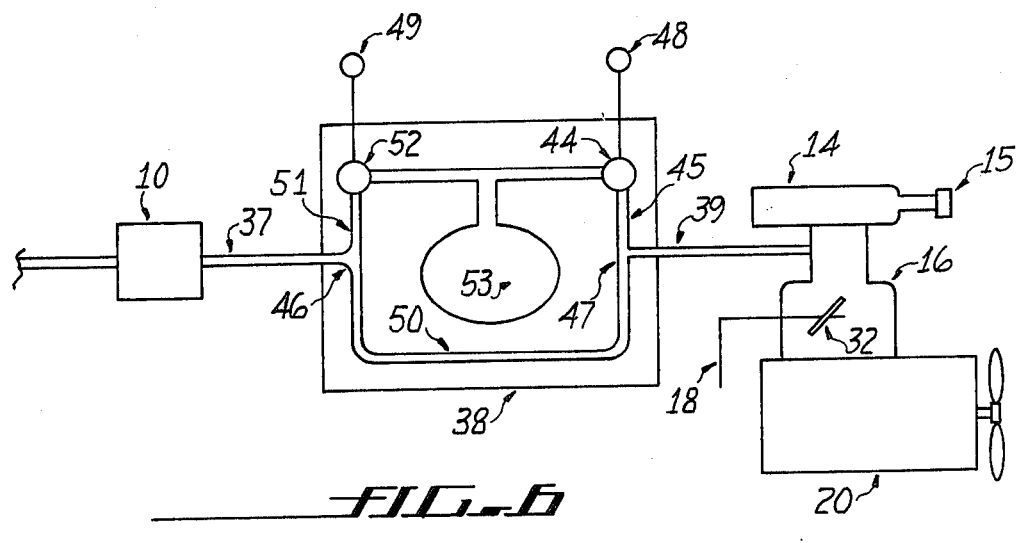
FIG. 6 is a diagrammatic presentation of the invention as applied to a standard internal combustion engine found on a standard automobile which utilizes a generalized reserve oxygen supply system which utilizes an oxygen reservoir which has a valve at both its inlet and outlet. These valves are such that one opens and the other closes or vice-versa in response to an acceleration cycle of said engine.

In FIG. 6 an embodiment of reserve oxygen reservoir means 38 is illustrated wherein oxygen line 37 is split by tee 46. Oxygen 21 can flow uninhibited via line 50 into second tee 47 and discharge into line 39 which leads to carburetor 16 equipped with restriction means 32 on fuel line 18 as per FIG. 3. At tee 46 a second oxygen line 51 leads to valve 52. Valve 52 is on one side of reserve oxygen reservoir 53 and valve 44 is on the other side of reserve oxygen reservoir 53. When valve 44 is open oxygen flows via line 45 to tee 47 and feeds into carburetor 16 via line 39. Valve 44 is operated by control means 48. Control means 48 is only activated when an engine acceleration parameter is activated, i.e. manifold vacuum decreases below normal level or carburetor accelerator pump is being depressed forcing extra fuel into the carburetor. Control means 48 is deactivated and closes valve 44 when these parameters reverse or stop. Valve 52 is operated by control means 49. Control means 49 is activated by the closing of valve 44. This causes valve 52 to open as valve 44 closes. Control means 49 is deactivated, closing valve 52, by an engine deceleration parameter i.e., manifold vacuum increases above normal level or carburetor accelerator pump returns to rest position. As such control valves 52 and 44 in response to control means 48 and 49 alternately pressurize reservoir 53 to the highest pressure achieved in line 51 just before the start of the previous deceleration cycle and discharge reservoir 53 to a pressure level equal to the pressure in line 45 at the end of the acceleration cycle.

Using the invention as described in FIG. 2 on a 1970 automobile equipped with a 350 cubic inch engine having approximately 90,000 miles on both the automobile and the engine, an increase in fuel mileage from approximately 9 miles per gallon to approximately 18 miles per gallon city driving and from approximately 17 miles per gallon to approximately 24 miles per gallon highway driving was achieved. This was coupled with a reduction in air pollutants to a level substantially below that required in the state of California for the make, year and model automobile used for the test vehicle. Safe utilization of the supplemental oxygen system was maintained by incorporating a safety shut off valve which independently responded to both the engine ignition and the engine oil pressure.

I claim:

1. In combination with a standard internal combustion engine a means for reducing the expulsion of air pollutants while maintaining fuel economy and safe usage of a supplemental oxygen supply which comprises a pressurized oxygen supply; a means for reducing the oxygen pressure; means for conducting such oxygen to a safety valve; means for opening and closing said safety valve independently in response to both the engine ignition system and a parameter responsive to both engine activation and shut down; means for further conducting said oxygen to a regulator means; said regulator means which supplies a variable volume of oxygen dependent on the needs of the engine; means of conducting said oxygen to the throat of a modified carburetor; said modified carburetor equipped with a means for restricting flow of atmospheric gases into said carburetor; said modified carburetor equipped with a means for restricting fuel flow within same said modified carburetor.

2. The invention of claim 1 wherein said safety valve is opened or closed independently in response to both the engine ignition and one or more engine parameters selected from oil pressure; manifold vacuum; crankshaft, camshaft or distributor shaft rotation; pulleys, belts or gears associated with crankshaft, camshaft or distributor shaft rotation; or electrical stimulus associated with distributor operation.

3. The invention of claim 2 wherein said safety valve opens or closes independently in response to both the engine ignition and the engine oil pressure.

4. The invention of claim 1 wherein said regulator means which supplies a variable supply of oxygen is open or closed in response to changes in the accelerator pedal position, carburetor butterfly valve rotation, manifold vacuum pressure or distributor rotation.

5. The invention of claim 1 wherein said means for restricting fuel flow within said modified carburetor is by reduction in the size of the fuel ports, reduction in the size of the fuel jets, shortening of the stroke of the carburetor accelerator pump linkage or a combination of two or more of the reduction in the size of fuel ports, reduction in the size of the fuel jets and a shortening of the stroke of the carburetor accelerator pump.

6. The invention of claim 1 wherein said safety valve is opened or closed independently in response to both the engine ignition and one or more engine parameters selected from oil pressure; manifold vacuum; crankshaft, camshaft or distributor shaft rotation; pulleys, belts or gears associated with crankshaft, camshaft or distributor shaft rotation; or electrical stimulus associated with distributor operation; and said regulator means which supplies a variable supply of oxygen is open or closed in response to changes in either the accelerator pedal position, carburetor butterfly valve rotation, manifold vacuum pressure or distributor rotation; and said means for restricting fuel flow within said modified carburetor is by reduction in the size of the fuel ports, reduction in the size of the fuel jets, shortening of the stroke of the carburetor accelerator pump linkage or a combination of two or more of the reduction in the size of the fuel ports, reduction in the size of the fuel jets and a shortening of the stroke of the carburetor accelerator pump.

7. The invention of claim 1 wherein said safety valve opens or closes independently in response to both the engine ignition and the engine oil pressure; and said regulator means is connected to the automobile accelerator pedal and opens and closes as said accelerator pedal is depressed and released respectfully; and said modified carburetor is equipped with reduced fuel ports and fuel jets and said means for restricting the flow of atmospheric gases into said carburetor is a plug in the intake port of an air cleaner attached to said carburetor.

8. In combination with a standard internal combustion engine a means for reducing the expulsion of air pollutants while maintaining fuel economy and safe usage of a supplemental oxygen supply which comprises a pressurized oxygen supply; a means for reducing the oxygen pressure; means for conducting such oxygen to a safety valve; means for opening and closing said safety valve independently in response to both the engine ignition system and a parameter responsive to both engine activation and shut down; means for further conducting said oxygen to a regulator means; said regulator means which supplies a variable volume of oxygen dependent on the needs of the engine; means of conducting said oxygen to the throat of a modified carburetor; said modified carburetor equipped with a means for restricting flow of atmospheric gases into said carburetor; said modified carburetor equipped with a means for restricting fuel flow within same said modified carburetor; and a means for the introduction of additional oxygen during engine acceleration.

9. The invention of claim 8 wherein said means for the introduction of additional oxygen comprises; a means for conducting oxygen in series with the primary oxygen conducting means between the safety valve means and the modified carburetor; and said means for conducting oxygen in series is fitted with a flow control valve which is opened or closed by a regulatory means; and said regulatory means is activated or deactivated in response to engine acceleration or deceleration.

10. The invention of claim 8 wherein said means for the introduction of additional oxygen consists of; a bellows which is attached to the conducting means between the control means and the modified carburetor and is compressed in conjunction to engine acceleration forcing additional oxygen into the conducting means attached to the modified carburetor.

11. The invention of claim 8 wherein said means for the introduction of additional oxygen consists of; a reservoir connected in series with the means for conducting oxygen between the control valve means and the modified carburetor; said reservoir is fitted with a valve at both its inlet and outlet; said valve of reservoir outlet is opened in response to engine acceleration and closed in response to normalization of engine speed; said valve at reservoir inlet is opened in response to closing of reservoir outlet valve; said valve at reservoir inlet is closed in response to engine deceleration.

* * * * *